United States Patent
Iwatani et al.

(10) Patent No.: US 9,623,514 B2
(45) Date of Patent: Apr. 18, 2017

(54) POWDER SUPPLY METHOD IN CLADDING

(71) Applicant: TOYOTA JIDOSHA KABUSHIKI KAISHA, Toyota-shi, Aichi-ken (JP)

(72) Inventors: Shingo Iwatani, Nagoya (JP); Akio Sato, Toyota (JP); Yoshinori Ishikawa, Okazaki (JP); Kenji Kidera, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 14/698,027

(22) Filed: Apr. 28, 2015

(65) Prior Publication Data
US 2015/0328718 A1 Nov. 19, 2015

(30) Foreign Application Priority Data
May 14, 2014 (JP) .................. 2014-100596

(51) Int. Cl.
| B23K 26/342 | (2014.01) |
| B23K 26/14 | (2014.01) |
| B23K 26/144 | (2014.01) |
| C23C 24/10 | (2006.01) |
| F01L 3/04 | (2006.01) |

(52) U.S. Cl.
CPC .......... *B23K 26/1411* (2013.01); *B23K 26/14* (2013.01); *B23K 26/144* (2015.10); *B23K 26/147* (2013.01); *B23K 26/1447* (2013.01); *B23K 26/1464* (2013.01); *B23K 26/342* (2015.10); *C23C 24/106* (2013.01); *F01L 3/04* (2013.01)

(58) Field of Classification Search
CPC .................................................. B23K 26/342
USPC ....................................... 219/121.64, 121.84
See application file for complete search history.

(56) References Cited

U.S. PATENT DOCUMENTS

| 3,883,711 A * | 5/1975 | Fischer ............... B23K 33/004 219/126 |
| 2006/0169679 A1 | 8/2006 | Sato et al. |
| 2006/0266740 A1 | 11/2006 | Sato et al. |
| 2012/0145683 A1 | 6/2012 | Miyagi et al. |

FOREIGN PATENT DOCUMENTS

| EP | 1 640 110 A1 | 3/2006 |
| JP | 2005-021908 A | 1/2005 |
| JP | 2005-219060 A | 8/2005 |
| WO | 2005/084875 A1 | 9/2005 |

* cited by examiner

*Primary Examiner* — Samuel M Heinrich
(74) *Attorney, Agent, or Firm* — Oliff PLC

(57) ABSTRACT

In a powder supply method in cladding, an outlet pressure of a coaxial-nozzle side of a supply pipe connecting a feeder to a coaxial nozzle is set within a predetermined range, and powder is supplied from the feeder to the coaxial nozzle.

9 Claims, 8 Drawing Sheets

POWDER SUPPLY METHOD IN CLADDING

INCORPORATION BY REFERENCE

The disclosure of Japanese Patent Application No. 2014-100596 filed on May 14, 2014 including the specification, drawings and abstract is incorporated herein by reference in its entirety.

BACKGROUND OF THE INVENTION

1. Field of the Invention

The present invention relates to a powder supply method in cladding, e.g., a powder supply method in cladding in which a machining part of a workpiece is irradiated with a laser beam and powder such as powder metal is discharged to a laser applied part of the machining part so as to form a clad layer in the machining part.

2. Description of Related Art

For example, in order to improve durability of a valve seat of a cylinder head for an engine and to increase its design flexibility, such laser machining has been known that a laser beam is applied to the valve seat while a powder-shaped (powdery) cladding material is supplied thereto, and the valve seat is rotated relative to the laser beam so as to form a clad layer. The laser machining is a technique in which: the cylinder head is subjected to machining necessary for a combustion chamber of the engine, e.g., a valve-hole forming machining or the like; and laser irradiation is performed on the cylinder head while the powder-shaped cladding material having abrasion resistance and made of copper alloy or the like is supplied to that region of the cylinder head which is to be a valve seat, so as to form a ring-shaped clad layer, namely, a clad bead part to become a valve seat eventually. The technique is generally called laser clad machining or cladding.

In the meantime, quality of a product subjected to the cladding depends on a supply amount of the cladding material to a nozzle during the cladding. Accordingly, in this field, it is desired to uniformly maintain a supply amount of the cladding material (powder), particularly, a supply amount of the powder to be supplied to a filling region for each of a plurality of discharge openings provided in a nozzle.

In order to deal with such a demand, Japanese Patent Application Publication No. 2005-219060 (JP 2005-219060 A) describes a conventional technique to perform cladding by use of the aforementioned powder cladding nozzle.

The conventional technique described in JP 2005-219060 A is as follows: a powder supply device is configured such that powder metal sent out by carrier gas from a powder (powder metal) source (hereinafter referred to as a feeder) is sequentially and evenly divided by branching means such as a tee provided in the middle of a feeding passage, so that the powder metal is filled into respective filling regions of a powder cladding nozzle that is divided into four parts by a dividing portion. The powder metal is filled thereto through four supply passages. In the powder supply device, feeding distances from an outlet of the feeder to respective supply passages of the powder cladding nozzle are the same.

In the conventional technique described in JP 2005-219060 A, the feeding distances of supply paths through which the powder is supplied to the respective filling regions of the powder cladding nozzle are set to the same with respect to the respective filling regions, thereby making it possible to perform cladding by simultaneously discharging the powder from the respective filling regions to the machining part.

However, as described in the conventional technique described in JP 2005-219060 A, even if the supply paths through which the powder is supplied to the respective filling regions of the powder cladding nozzle are set to have the same feeding distance and the powder is simultaneously discharged to the machining part from the respective filling regions, it is difficult to uniformly maintain supply amounts of the powder to be supplied to the respective filling regions of the powder cladding nozzle. This causes unevenness in a clad layer formed by cladding, which may make it difficult to stabilize quality of the clad layer, eventually, quality of a product on which the cladding is performed.

SUMMARY OF THE INVENTION

The present invention provides a powder supply method in cladding which is able to restrain unevenness in a clad layer formed by cladding, by reducing a variation in supply amount of powder to be supplied to a powder cladding nozzle, and which is able to stabilize quality of the clad layer, eventually, quality of a product on which cladding is performed.

As a result of diligent studies, inventors of the present invention found that quality of a clad layer formed by cladding largely depends on an outlet pressure of a supply passage to a powder cladding nozzle in the cladding (that is, a pressure of an outlet side of the supply passage to the powder cladding nozzle, and a pressure corresponding to a discharge pressure of powder with respect to the powder cladding nozzle).

That is, a powder supply method in cladding according to one aspect of the present invention is a powder supply method in cladding to form a clad layer in a workpiece. In the powder supply method, powder is force-fed and supplied from a powder source to a powder cladding nozzle, and the powder cladding nozzle passes a laser beam through the powder cladding nozzle and discharges the powder toward the laser beam from a periphery of the laser beam. The powder supply method includes: setting, within a predetermined range, an outlet pressure of a powder-cladding-nozzle side of a supply pipe connecting the powder source to the powder cladding nozzle; and supplying the powder from the powder source to the powder cladding nozzle.

In the powder supply method described above, the outlet pressure of the powder-cladding-nozzle side of the supply pipe connecting the powder source to the powder cladding nozzle is set within a predetermined range, and the powder is supplied from the powder source to the powder cladding nozzle. Hereby, a variation in supply amount of the powder to be supplied to the powder cladding nozzle is reduced, thereby making it possible to restrain unevenness in a clad layer to be formed by the cladding and to stabilize quality of the clad layer.

Note that the "setting, within a predetermined range, an outlet pressure of a powder-cladding-nozzle side of a supply pipe, and supplying the powder from the powder source to the powder cladding nozzle" includes: forming a clad layer in a workpiece by supplying the powder from the powder source to the powder cladding nozzle while the outlet pressure of the powder-cladding-nozzle side of the supply pipe is adjusted so as to fall within the predetermined range; and forming a clad layer in a workpiece by supplying the powder from the powder source to the powder cladding nozzle such that, before the powder cladding nozzle is connected to the supply pipe, the outlet pressure of the powder-cladding-nozzle side of the supply pipe is adjusted in advance so as to fall within the predetermined range, and then, the powder cladding nozzle is connected to the supply pipe.

Further, as a result of diligent studies, the inventors found that, in a case where the supply pipe is configured such that a connection pipe in the supply pipe is connected to the powder source and the supply pipe is branched so that the supply pipe is connected to a plurality of supply passages provided in the powder cladding nozzle, that outlet pressure of the supply passage to the powder cladding nozzle which contributes to quality of a clad layer largely depends on a length of a connection pipe connected to the powder cladding nozzle.

That is, in the powder supply method in cladding according to the present invention, a length of that connection pipe in the supply pipe which is connected to the supply passage of the powder cladding nozzle may be adjusted so that the outlet pressure falls within the predetermined range.

In the powder supply method described above, the length of that connection pipe in the supply pipe which is connected to the supply passage of the powder cladding nozzle is adjusted so that the outlet pressure of the powder-cladding-nozzle side of the supply pipe falls within the predetermined range. Hereby, with a simple method, a variation in supply amount of the powder to be supplied to the powder cladding nozzle is reduced, thereby making it possible to restrain unevenness in a clad layer to be formed by the cladding and to stabilize quality of the clad layer.

In the powder supply method in cladding according to the present invention, respective pipe lengths from the powder source to the plurality of supply passages of the powder cladding nozzle may be equal to each other.

In the powder supply method in cladding according to the present invention, the supply pipe may include a first connection pipe connected to the powder source, a plurality of second connection pipes connected to the first connection pipe and configured to be branched from the first connection pipe into a plurality of directions, and a plurality of third connection pipes connected to the second connection pipes and configured to be branched from the plurality of second connection pipes into a plurality of directions, and end parts of the plurality of third connection pipes may be connected to the plurality of supply passages provided in the powder cladding nozzle.

In the powder supply method in cladding according to the present invention, the plurality of second connection pipes may be set to have the same length, and the plurality of third connection pipes may be set to have the same length.

In the powder supply method in cladding according to the present invention, length of the connection pipes connected to the supply passages of the powder cladding nozzle may be 0.5 m to 1.0 m.

In the powder supply method in cladding according to the present invention, the predetermined range may be set based on a setting lower limit of a cladding thickness.

As can be understood from the above description, the powder supply method in cladding according to the present invention is performed such that, in the cladding in which a machining part of a workpiece is irradiated with a laser beam and powder is discharged to a laser applied part of the machining part so as to form a clad layer in the machining part, the outlet pressure of the powder-cladding-nozzle side of the supply pipe configured to supply the powder from the powder source to the powder cladding nozzle is set within the predetermined range, and the powder is supplied from the powder source to the powder cladding nozzle. Accordingly, a variation in supply amount of the powder to be supplied to the powder cladding nozzle is reduced, thereby making it possible to restrain unevenness in a clad layer formed by the cladding, and to stabilize quality of the clad layer, eventually, quality of a product on which the cladding is performed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

With reference to drawings, the following describes an embodiment of a powder supply method in cladding according to the present invention.

Figure 1:
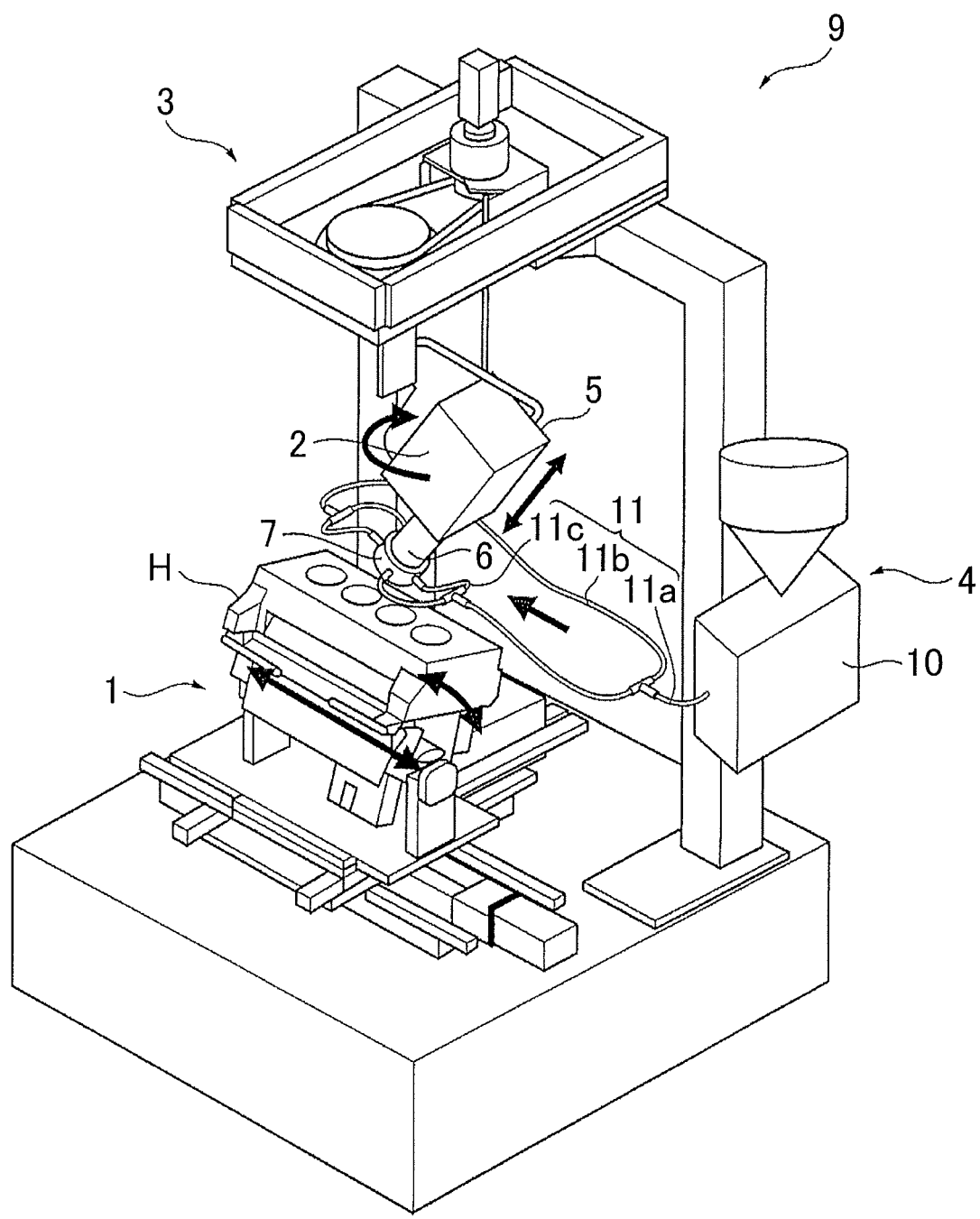
FIG. 1 is a perspective view diagrammatically illustrating a main configuration of a laser cladding device to which a powder supply method in cladding according to the present invention is applied.
Figure 2:
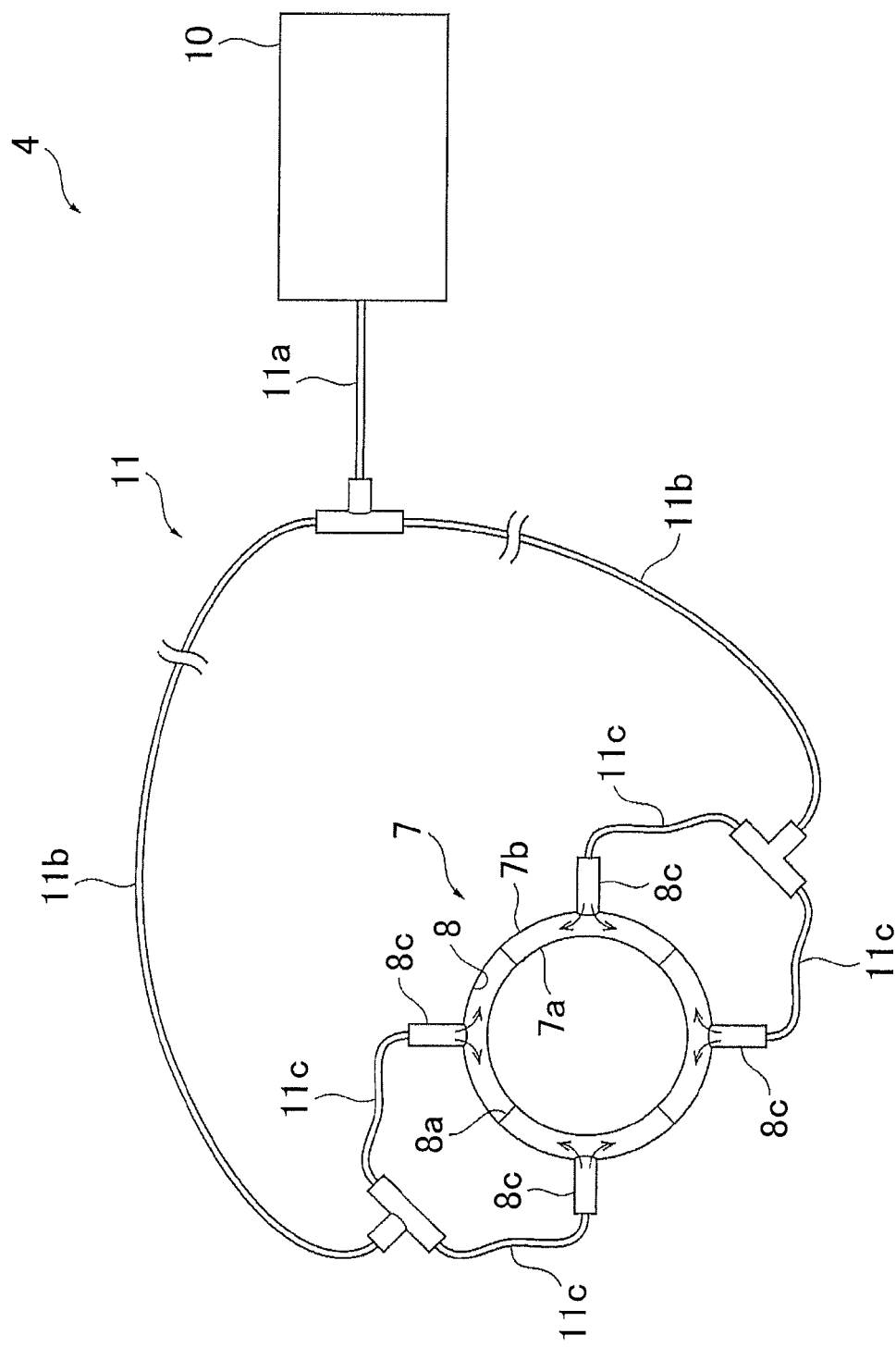
FIG. 2 is a schematic view diagrammatically illustrating a main configuration of a powder supply device illustrated in FIG. 1.

First, with reference to FIGS. 1 and 2, the following generally gives an outline of an example of a laser cladding device to which the powder supply method in cladding of the present invention is applied, and a powder supply device thereof. FIG. 1 is a perspective view diagrammatically illustrating a main configuration of the laser cladding device to which the powder supply method in cladding of the present invention is applied, and FIG. 2 is a schematic view diagrammatically illustrating a main configuration of the powder supply device illustrated in FIG. 1;

A laser cladding device 9 illustrated in FIG. 1 is a device configured to perform laser clad machining (cladding) on a valve seat portion of a cylinder head H, for example. The laser cladding device 9 includes: a cylinder head holding device 1 configured to hold the cylinder head H in a tilting manner; a laser machining head 2 configured to apply a laser beam to a machining part and to discharge powder metal (powder) (a material mainly made of copper, for example) thereto; a rotating device 3 configured to hold the laser machining head 2 in a vertically inclined manner and to rotate the laser machining head 2 around a vertical axis; and a powder supply device 4 configured to supply the powder metal to the laser machining head 2.

The cylinder head holding device 1 is configured to tilt the cylinder head H so that a central axis of a valve seat portion is aligned in a vertical direction, and to two-dimensionally move the cylinder head H in a horizontal direction so that the central axis of the valve seat portion coincides with a rotation axis of the laser machining head 2.

The laser machining head 2 mainly includes: a laser generation portion 5 configured to generate a laser beam; an optical system portion 6 provided with a condensing lens and the like for condensing the laser beam; and a coaxial nozzle (a powder cladding nozzle) 7 having a double-tube structure and configured to pass the laser beam therethrough and to discharge powder metal around the laser beam.

Further, the powder supply device 4 mainly includes: a powder metal (powder) source (a feeder) 10 configured to accumulate therein powder metal to be supplied to the laser machining head 2; and a supply pipe 11 connecting the feeder 10 to the coaxial nozzle 7 of the laser machining head 2.

The coaxial nozzle 7 of the laser machining head 2 is connected to the feeder 10 of the powder supply device 4 via the supply pipe 11. In the laser cladding device 9, a suitable amount of the powder metal for a clad layer to be formed in a machining part is supplied from the feeder 10 to the coaxial nozzle 7 via the supply pipe 11, a suitable output of a laser beam for the powder metal is generated by the laser generation portion 5, and the powder metal is discharged toward the laser beam from its periphery while the laser beam is applied to the machining part via the coaxial nozzle 7. Hereby, a desired clad layer can be formed in the valve seat portion of the cylinder head H.

More specifically, as illustrated in FIG. 2, the coaxial nozzle 7 mainly includes: a generally circular tube-shaped inner nozzle member 7*a* having a laser passage for the laser beam to pass; and an outer nozzle member 7*b* outwardly engaged with the inner nozzle member 7*a*. An inner peripheral surface of the outer nozzle member 7*b* has a complementary shape with an outer peripheral surface of the inner nozzle member 7*a*. The inner nozzle member 7*a* is placed coaxially with the outer nozzle member 7*b*, and a generally toric discharge space 8 through which the powder metal passes is defined between the inner nozzle member 7*a* and the outer nozzle member 7*b*. Note that the inner nozzle member 7*a* and the outer nozzle member 7*b* decrease in diameter toward their tip end side.

The toric discharge space 8 is divided into a plurality of small spaces (four small spaces, in the figure) by a plurality of separating walls 8*a* provided at even intervals in a circumferential direction (four separating walls 8*a* provided at intervals of 90 degrees, in the figure). In a generally central part of each of the small spaces in the circumferential direction, a supply passage 8*c* configured to supply the powder metal to the each of the small spaces is provided in a connected manner, so as to extend outwardly. Note that a tip end portion of each of the small spaces of the discharge space 8 forms a discharge opening configured to discharge the powder metal to outside the coaxial nozzle 7.

In the meantime, the supply pipe 11 of the powder supply device 4 is made of a resin material or a metallic material, for example. The supply pipe 11 is mainly constituted by: a connection pipe 11*a* connected to the feeder 10; connection pipes 11*b* connected to the connection pipe 11*a* so as to branch off from the connection pipe 11*a* into a plurality of directions (two direction in the figure); and connection pipes 11*c* (four connection pipes in the figure) connected to each of the connection pipes 11*b* so as to branch off from the each of the connection pipes 11*b* into a plurality of directions (two direction in the figure). An end part of each of the connection pipes 11*c* is connected to each of the supply passages 8*c* communicating with each of the small spaces of the coaxial nozzle 7. In order to secure uniformity by simultaneously discharging the powder metal from the circumference of the discharge opening of the coaxial nozzle 7, pipe lengths (also referred to as a feeding distance) from the feeder 10 to respective supply passages 8*c* of the coaxial nozzle 7 are set to be equal to each other, lengths of respective connection pipes 11*b* are set to be equal to each other, and lengths of respective connection pipes 11*c* are also set to be equal to each other. Further, in order to supply the powder metal to respective supply passages 8*c* by sequentially and evenly dividing the powder metal at respective branch portions of the supply pipe 11, the connection pipes 11*b* are set to have the same inside diameter and the connection pipes 11*c* are set to have the same inside diameter.

Further, the feeder 10 is provided with a carrier gas pipe (not shown) through which carrier gas made of inert gas such as nitrogen gas passes. Hereby, by use of the carrier gas, the powder metal and the carrier gas are force-fed and supplied to the coaxial nozzle 7 from the feeder 10 through the supply pipe 11.

Although not illustrated herein, the outer nozzle member 7*b* is provided with a gas supply passage through which inert gas such as nitrogen gas passes. The inert gas supplied through the gas supply passage is supplied to a gas filling space defined between the inner nozzle member 7*a* and the outer nozzle member 7*b*, and to a laser passage of the inner nozzle member 7*a* through a plurality of gas discharge passages formed in the inner nozzle member 7*a* so as to communicate with the gas filling space.

When the powder metal is supplied from the feeder 10 to the coaxial nozzle 7, a switchover valve provided in the carrier gas pipe is opened, so that the powder metal (a suitable amount of the powder metal for a clad layer to be formed in a machining part) that is accumulated in the feeder 10 is sent out to the connection pipe 11*a* with the carrier gas supplied from the carrier gas pipe, by a pressure of the carrier gas thus supplied. Then, the powder metal passes through the connection pipes 11*b* and the connection pipes 11*c* while being divided sequentially and evenly at each branch portion. Thus, the powder metal is supplied to each of the supply passages 8*c* of the coaxial nozzle 7. The powder metal thus supplied to each of the supply passages 8*c* is introduced into that small space of the discharge space 8 which corresponds to the each of the supply passages 8*c*. The powder metal is then spread or dispersed to a circumferential direction in the each of the small spaces so that the powder metal is uniformed, and then, the powder metal is discharged outside from the discharge opening on the tip end side of the each of the small spaces.

The powder metal thus discharged through the discharge opening is melted by a laser beam emitted from the laser generation portion 5 of the laser machining head 2 via the laser passage of the inner nozzle member 7*a*. The powder metal thus melted is welded to a machining part of a workpiece. The powder metal thus welded is cooled down to be solidified, and hereby, a clad layer having a predetermined thickness and a predetermined outer shape is formed in the machining part of the workpiece. Note that, as described above, the laser passage of the inner nozzle member 7*a* serves as a passage for the inert gas supplied through the gas supply passage or the like, so that the inert gas is ejected toward the machining part of the workpiece through the laser passage at the time of the laser clad machining.

Note that an amount of the powder metal to be sent out from the feeder 10 to the supply pipe 11 and a flow rate and a pressure (a feeder internal pressure) of the carrier gas to be sent out from the feeder 10 to the supply pipe 11 are managed by the feeder 10.

Figure 3:
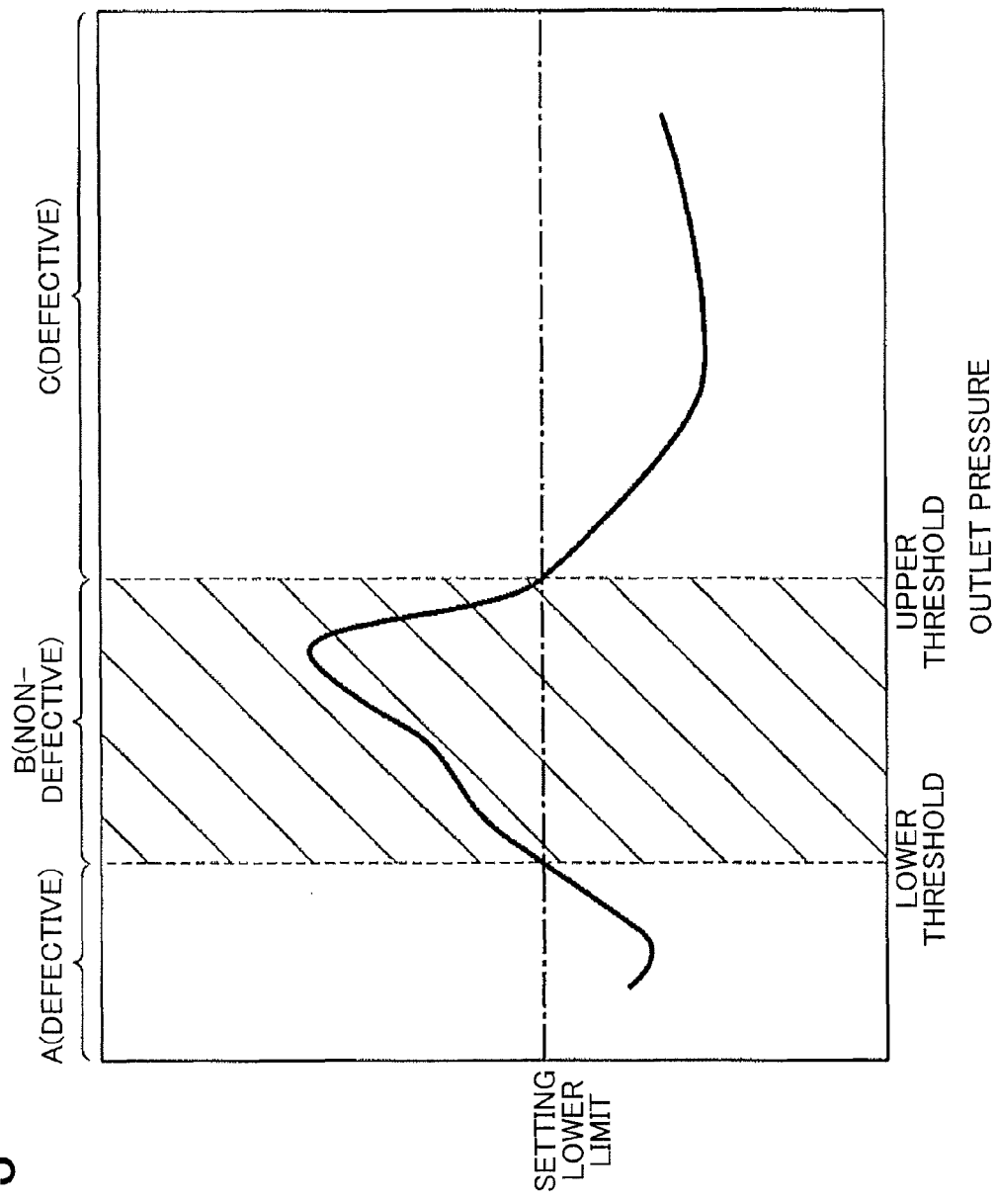
FIG. 3 is a view to describe a relationship between an outlet pressure of a connection pipe on a coaxial nozzle side and a thickness of a clad layer.

Referring now to FIG. 3, the following describes the powder supply method in cladding of the present invention, and a designing method of the powder supply device along with this.

The following facts are confirmed by experiments performed by the inventors. That is, in the laser cladding device 9 configured as described above, at the time when the powder metal is force-fed to the coaxial nozzle 7 of the laser machining head 2 from the feeder 10 of the powder supply device 4, even if the flow rate and the pressure of the carrier gas to be sent out from the feeder 10 to the supply pipe 11 are managed precisely, an outlet pressure of the supply pipe 11 (a pressure of that outlet port of the supply pipe 11 which is closer to the supply passages 8c of the coaxial nozzle 7), that is, an outlet pressure of each of the connection pipes 11c constituting the supply pipe 11 varies due to a pressure loss or the like in the supply pipe 11. Further, due to the variation of the outlet pressure of the connection pipe 11c, the quality of the clad layer formed in the machining part of the workpiece, particularly, a thickness and a shape of the clad layer changes.

More specifically, as illustrated in FIG. 3, it has been confirmed that, when the outlet pressure of the connection pipe 11c decreases (a defective region A in the figure), the thickness of the clad layer becomes smaller than a setting lower limit that is set in advance. A conceivable reason is as follows, for example: the powder metal is clogged up or remains in the discharge space 8 of the coaxial nozzle 7, or an ejection force of the powder metal discharged from the discharge opening of the discharge space 8 of the coaxial nozzle 7 decreases, so that a desired amount of the powder metal does not reach the machining part of the workpiece. It has been also confirmed that, in a case where the outlet pressure of the connection pipe 11c is high (a defective region C in the figure), the thickness of the clad layer becomes smaller than the setting lower limit that is set in advance. Conceivable reasons are as follows, for example: due to the outlet pressure (discharge pressure) of the connection pipe 11c, the powder metal melted in the machining part of the workpiece deforms so that the clad layer deforms from its desired shape; and the behavior of the powder metal discharged from the discharge opening of the discharge space 8 of the coaxial nozzle 7 is unstable, so that a desired amount of the powder metal does not reach the machining part of the workpiece. When the thickness of the clad layer decreases to be smaller than the setting lower limit as such, it is difficult to secure a machining allowance at the time when the clad layer is finished into a product shape, so that a surface as forged remains after the finishing, which results in a decrease in the quality of the product.

Accordingly, it is considered that, by setting the outlet pressure of the connection pipe 11c of the supply pipe 11 within a predetermined range (a non-defective region B in the figure), a thickness of the clad layer, that is, a machining allowance to finish the clad layer into a product shape is secured, and the quality of the clad layer formed in the machining part of the workpiece is secured, so that the quality of the product subjected to the cladding can be secured.

In view of this, in the present embodiment, the powder metal is supplied from the feeder 10 to the coaxial nozzle 7 with the outlet pressure of the connection pipe 11c of the supply pipe 11 being set within a predetermined range (the non-defective region B in the figure). Note that an example of a setting method of the outlet pressure of the connection pipe 11c may be as follows: before connecting the connection pipe 11c to the supply passage 8c of the coaxial nozzle 7, a predetermined pressure measurement device is attached to a discharge side of the connection pipe 11c; in that state, the switchover valve provided in the carrier gas pipe of the feeder 10 is opened; and each constituent of the laser cladding device 9 (particularly, the powder supply device 4) is adjusted so that a pressure measured by the pressure measurement device falls within a predetermined range (in the non-defective region B, in the figure). Alternatively, the following method may be employed: in a state where the connection pipe 11c is connected to the supply passage 8c of the coaxial nozzle 7, a predetermined pressure measurement device is attached to a vicinity of an outlet of the connection pipe 11c; the switchover valve provided in the carrier gas pipe of the feeder 10 is opened to supply the powder metal from the feeder 10 to the coaxial nozzle 7, so that an outlet pressure of the connection pipe 11c is measured by the pressure measurement device; and each constituent of the laser cladding device 9 (particularly, the powder supply device 4) is adjusted so that the outlet pressure thus measured by the pressure measurement device falls within a predetermined range (in the non-defective region B, in the figure).

As such, in the laser clad machining (cladding), when the powder metal is supplied from the feeder 10 to the coaxial nozzle 7 by setting, within a predetermined range, the outlet pressure of the connection pipe 11c of the supply pipe 11 configured to supply the powder metal from the feeder 10 to the coaxial nozzle 7, it is conceivable that a variation in supply amount of the powder metal to be supplied to the coaxial nozzle 7 is reduced, thereby making it possible to restrain unevenness in a clad layer to be formed by the cladding and to stabilize the quality of the clad layer.

Further, a whole length of the supply pipe 11 connecting the feeder 10 to the coaxial nozzle 7 is designed based on an environment around an area where the laser cladding device 9 is disposed, for example. However, that outlet pressure of the connection pipe 11c which contributes to the quality of the clad layer largely depends on only the length of the connection pipe 11c that is directly connected to the coaxial nozzle 7, which has been confirmed by experiments performed by the inventors. Note that the following fact has been confirmed that, even in a case where the whole length of the supply pipe 11 is uniform, if the length of the connection pipe 11c is shortened, the outlet pressure of the connection pipe 11c decreases, and if the length of the connection pipe 11c is extended, the outlet pressure of the connection pipe 11c increases.

Accordingly, by adjusting the length of the connection pipe 11c so that the outlet pressure of the connection pipe 11c falls within the above predetermined range, it is presumably possible to reduce the variation in supply amount of the powder metal to be supplied to the coaxial nozzle 7 with a simple method, thereby making it possible to restrain unevenness in a clad layer to be formed by the cladding and to stabilize the quality of the clad layer. Further, it is presumably possible to easily design and manufacture the powder supply device 4 that can form a clad layer having a desired quality (a thickness and a shape).

Note that the above embodiment mainly describes an aspect in which the powder metal is used in the laser clad machining. However, any material can be used as the powder used in the laser clad machining, provided that a desired clad layer can be formed in the machining part of the workpiece.

Further, as long as uniformity of powder distribution in the coaxial nozzle 7 can be secured, an inner structure of the coaxial nozzle 7, the number of supply passages 8c of the coaxial nozzle 7, the number of connection pipes 11c connected to the supply passages 8c, a branch structure of the supply pipe 11, and the like can be changed appropriately.

For example, the above embodiment describes an aspect in which the separating walls 8a configured to divide the discharge space 8 into a plurality of small spaces in the circumferential direction are provided in the discharge space 8 defined by the inner nozzle member 7a and the outer nozzle member 7b constituting the coaxial nozzle 7. However, as long as the uniformity of the powder distribution in the coaxial nozzle 7 can be secured, the separating walls 8a may be omitted, or the number of separating walls 8a may be reduced (that is, the number of separating walls 8a is designed to be different from the number of supply passages 8c). Further, the above embodiment describes an aspect in which the supply passages 8c are provided in a connected manner to respective small spaces of the discharge space 8 so as to extend outwardly, and the powder is introduced into the respective small spaces toward a center of the coaxial nozzle 7. However, a supply direction of the powder to the respective small spaces can be changed appropriately. Further, the above embodiment describes an aspect in which the respective small spaces of the discharge space 8 divided by the separating walls 8a have the same magnitude. However, in consideration of an aspect in which the coaxial nozzle 7 is used in an inclined posture relative to a vertical direction, for example, the respective small spaces may have different magnitudes, and the separating walls 8a may not be provided at even intervals. Note that, in order to secure the uniformity of the powder distribution in the coaxial nozzle 7, the supply pipe 11 connecting the feeder 10 to the coaxial nozzle 7 is preferably configured such that the connection pipe 11a in the supply pipe 11 connected to the feeder 10 and the supply pipe 11 is branched at least once so as to be connected to a plurality of supply passages provided in the coaxial nozzle 7 (e.g., a plurality of supply passages provided at positions symmetrical to each other along a shaft center of the nozzle), and the powder to be supplied from the feeder 10 is introduced from a plurality of parts of the coaxial nozzle 7 into the discharge space 8.

[Experiment on Specimen to Evaluate Relationship between Outlet Pressure of Connection Pipe on Coaxial Nozzle Side and Thickness of Clad Layer, and Result thereof]

The inventors formed a clad layer made of copper alloy in a machining part (a valve seat portion of that cylinder head for an engine which is made of aluminum as a matrix) of a workpiece by use of the laser cladding device using the powder supply device configured as illustrated in FIGS. 1 and 2. The inventors then evaluated a relationship between an outlet pressure of a connection pipe on a coaxial nozzle side and a thickness of the clad layer at this time.

Here, the supply pipe 11 connecting the feeder 10 to the coaxial nozzle 7 was made of a resin tube, and the connection pipe 11a of the supply pipe 11, connected to the feeder 10, had a length of 150 mm and an inside diameter of ϕ 6 mm. Further, two connection pipes 11b connected to the connection pipe 11a so as to branch off from the connection pipe 11a into two directions had a length of 2000 mm and an inside diameter of ϕ 6 mm. Further, each of the connection pipes 11b was branched into two directions to form four connection pipes 11c in total, and the connection pipes 11c thus connected to the connection pipes 11b had a length of 200 mm and an inside diameter of ϕ 6 mm. Further, a flow rate of a carrier gas (nitrogen gas) was 10 L/min, and a feeder internal pressure (a pressure of the carrier gas to be sent out from the feeder 10 to the supply pipe 11) was 2.0 kPa.

Figure 4:
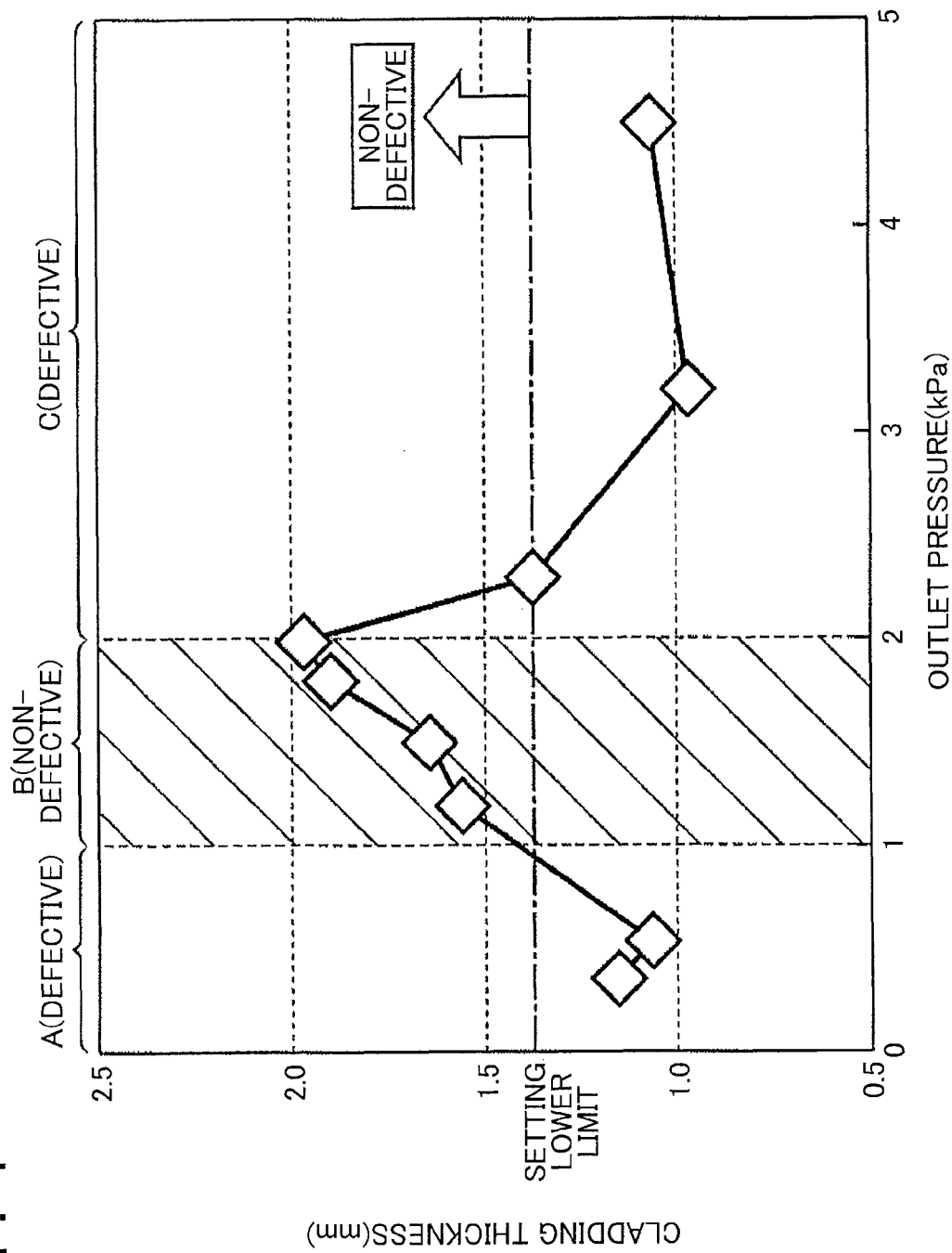
FIG. 4 is a view illustrating an experimental result of evaluation on the relationship between the outlet pressure of the connection pipe on the coaxial nozzle side and the thickness of the clad layer.
Figure 5:
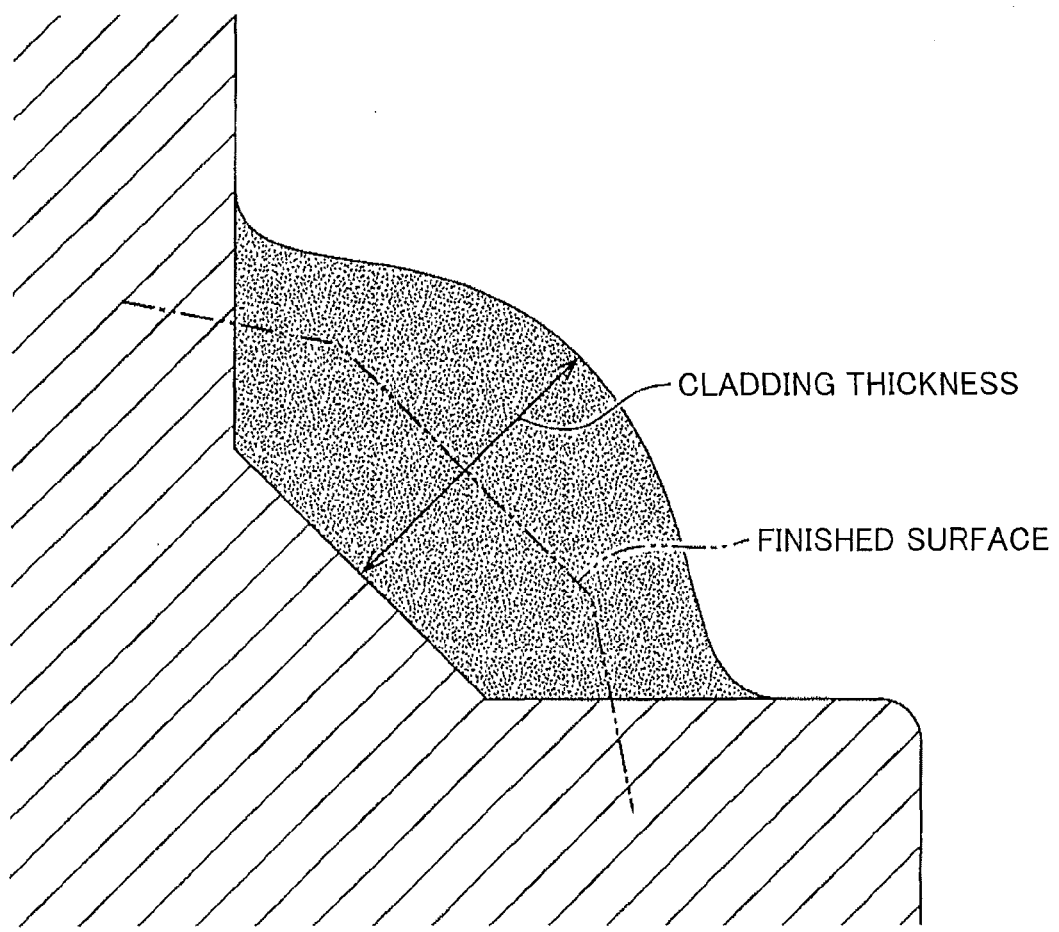
FIG. 5 is a view illustrating a section observation result of a clad layer in a non-defective product region as illustrated in FIG. 4.
Figure 6:
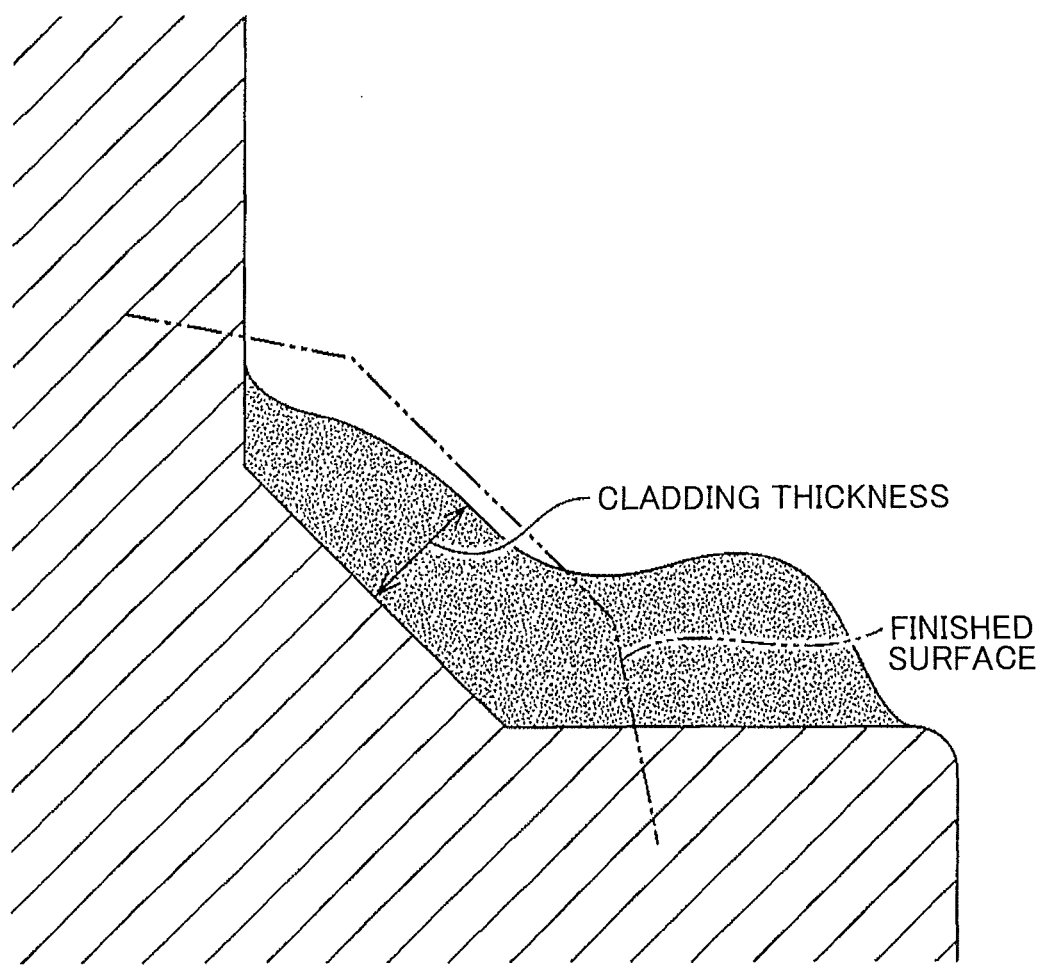
FIG. 6 is a view illustrating a section observation result of the clad layer in a defective product region as illustrated in FIG. 4.

The following Table 1 and FIG. 4 illustrate an experimental result of evaluation on the relationship between the outlet pressure of the connection pipe 11c on the coaxial-nozzle-7 side and the thickness of the clad layer. Further, FIGS. 5 and 6 illustrate section observation results of the clad layer in a non-defective region (the non-defective region B) and in a defective region (the defective region C) in FIG. 4, respectively. Note that a measurement of the thickness of the clad layer was performed on a generally central part of a section of the valve seat portion as a machining part.

TABLE 1

| | pipe outlet pressure (kPa) | cladding thickness (mm) |
|---|---|---|
| case 1 | 1.55 | 1.70 |
| case 2 | 1.60 | 1.72 |
| case 3 | 1.35 | 1.76 |
| case 4 | 1.30 | 1.80 |

As illustrated in Table 1 and FIG. 4, the outlet pressure of the connection pipe 11c contributes to the thickness of the clad layer formed in the machining part. The following facts were confirmed: when the outlet pressure of the connection pipe 11c is about 0.5 kPa or more, the thickness of the clad layer increases; when the outlet pressure reaches about 1.0 kPa, the thickness of the clad layer becomes a setting lower limit or more; and when the outlet pressure reaches about 2.0 kPa, the thickness of the clad layer begins to decrease. That is, it was confirmed that, when each constituent (e.g., the branch structure of the supply pipe 11 and the length of each of the connection pipes 11a to 11c) of the laser cladding device was adjusted so that the outlet pressure of the connection pipe 11c fell within 1.0 kPa to 2.0 kPa, the thickness of the clad layer formed in the machining part, that is, a machining allowance to finish the clad layer into a product shape could be secured.

More specifically, as illustrated in FIG. 6, it was confirmed that a clad layer formed in a region (the defective region C in FIG. 4) where the outlet pressure of the connection pipe 11c became higher than 2.0 kPa had a shape that slides downward, so that an upper part of the clad layer could not secure a machining allowance relative to a finished surface, and a surface as forged remained after the finishing. Note that, in this case, a melting amount of aluminum increased in the vicinity of the upper part of the clad layer, so that an aluminum dilution concentration of the clad layer was 1% by weight or more.

In the meantime, as illustrated in FIG. 5, it was confirmed that a clad layer formed in a region (the non-defective region B in FIG. 4) where the outlet pressure of the connection pipe 11c fell within a range of 1.0 kPa to 2.0 kPa was formed generally in parallel to a finished surface, so that a surface as forged could be entirely removed by the finishing. Note that, in this case, an aluminum dilution concentration of the clad layer was 0.5% by weight or more.

From the experimental result, it was demonstrated that, when the outlet pressure of the connection pipe 11c was set within 1.0 kPa to 2.0 kPa and the powder metal made of copper alloy was supplied from the feeder 10 to the coaxial nozzle 7 so as to form a clad layer, unevenness in the clad layer formed by cladding could be restrained, thereby resulting in that the clad layer having a stable quality could be formed.

[Experiment on Specimen to Evaluate Relationship between Length of Connection Pipe on Coaxial Nozzle Side and Outlet Pressure, and Result thereof]

Figure 7:
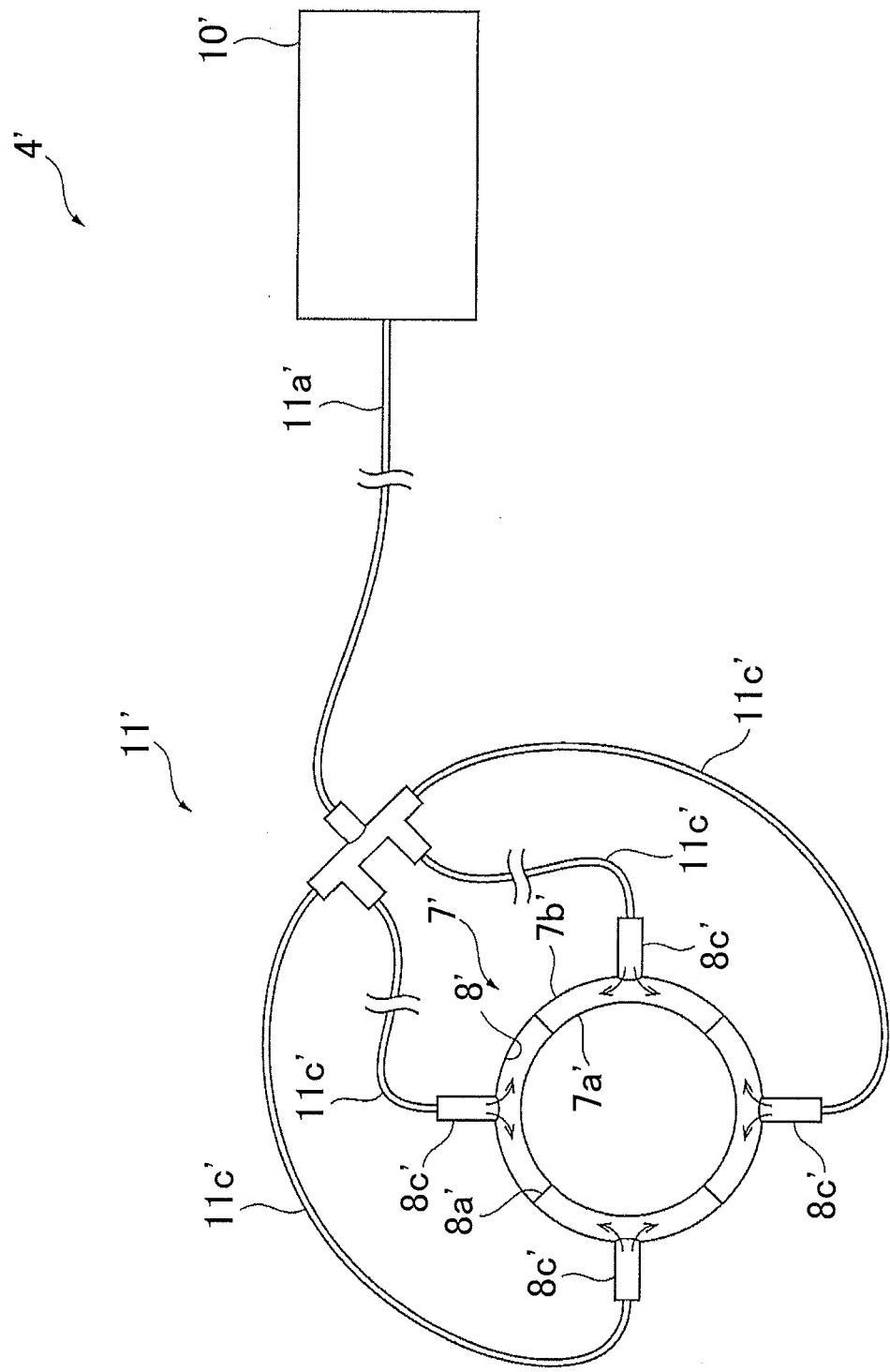
FIG. 7 is a schematic view diagrammatically illustrating another example of the powder supply device illustrated in FIG. 2.

The inventors formed a clad layer made of copper alloy in a machining part (a valve seat portion of that cylinder head for an engine which is made of aluminum as a matrix) of a workpiece by use of a laser cladding device using a powder supply device configured as illustrated in FIG. 7. The inventors then evaluated a relationship between a length of a connection pipe on a coaxial nozzle side and an outlet pressure at this time.

First, the following gives an outline of a configuration of the powder supply device illustrated in FIG. 7. The powder supply device illustrated in FIG. 7 is different from the powder supply device illustrated in FIGS. 1 and 2 in a branch configuration of a supply pipe, and the other configuration thereof is the same as the powder supply device illustrated in FIGS. 1 and 2.

More specifically, as illustrated in FIG. 7, a supply pipe 11' of a powder supply device 4' is made of a resin tube, and is constituted by a connection pipe 11a' connected to a feeder 10', and connection pipes 11c' connected to the connection pipe 11a' so as to branch off from the connection pipe 11a' into four directions. End parts of respective connection pipes 11e are connected to respective supply passages 8c' communicating with respective small spaces of a coaxial nozzle 7' (four small spaces formed by dividing a discharge space 8' by four separating walls 8a' at intervals of 90 degrees in a circumferential direction, the discharge space 8' being defined by an inner nozzle member 7a' and an outer nozzle member 7b'). Respective connection pipes 11c' are set to have the same length, and pipe lengths from the feeder 10' to respective supply passages 8c' of the coaxial nozzle 7' are set to the same. Further, in order to supply powder metal to the respective supply passages 8c' by evenly dividing the powder metal at respective branch portions of the supply pipe 11', the connection pipes 11c' are set to have the same inside diameter.

When the powder metal is supplied from the feeder 10' to the coaxial nozzle 7', a switchover valve provided in a carrier gas pipe is opened, so that the powder metal accumulated in the feeder 10' is sent out to the connection pipe 11a' with carrier gas supplied from the carrier gas pipe by a pressure of the carrier gas thus supplied. Then, the powder metal passes through the connection pipes 11c' while being divided evenly at the branch portions. Thus, the powder metal is supplied to each of the supply passages 8c' of the coaxial nozzle 7'. The powder metal supplied to the supply passages 8c' is introduced into their corresponding small spaces of the discharge space 8' and spread or dispersed in the small spaces in a circumferential direction so as to be uniformed. Then, the powder metal is discharged outside from discharge openings on respective tip end sides of the small spaces.

Note that, as described about the powder supply device illustrated in FIGS. 1 and 2, as long as uniformity of powder distribution in the coaxial nozzle 7' can be secured, the separating walls 8a' may be omitted, or the number of separating walls 8a' may be reduced (that is, the number of separating walls 8a' is designed to be different from the number of supply passages 8c').

Here, that connection pipe 11a' of the supply pipe 11' which was connected to the feeder 10' and each of the connection pipes 11c' had an inside diameter of φ 6 mm. Further, a flow rate of the carrier gas (nitrogen gas) was 10 L/min, and a feeder internal pressure was 2.0 kPa.

Figure 8:
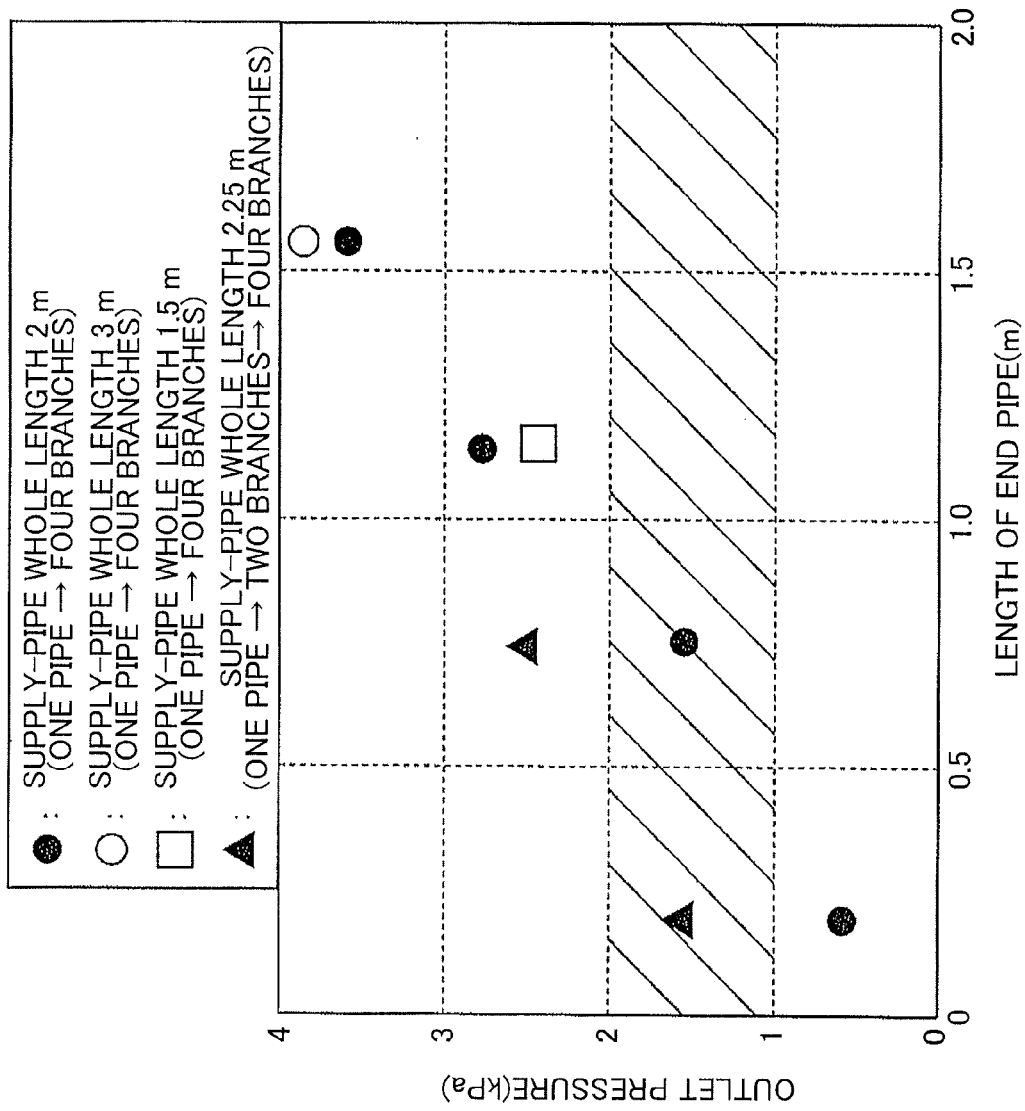
FIG. 8 is a view illustrating an experimental result of evaluation on a relationship between a length of a connection pipe on a coaxial nozzle side and an outlet pressure.

FIG. 8 is a view illustrating an experimental result of evaluation on a relationship between a length of the connection pipe 11c' on a coaxial-nozzle-7' side and an outlet pressure. Note that FIG. 8 also illustrates a relationship between a length of a connection pipe on an coaxial nozzle side and an outlet pressure at the time of forming a clad layer in a machining part of a workpiece by use of the laser cladding device using the powder supply device configured as illustrated in FIGS. 1 and 2 (a triangle mark in FIG. 8). Note that, as described based on FIG. 4, even in a case where a clad layer is formed in a machining part of a workpiece by use of a laser cladding device using the powder supply device 4' illustrated in FIG. 7, it is presumably preferable that each constituent of the laser cladding device be adjusted so that the outlet pressure of the connection pipe 11c' falls within 1.0 kPa to 2.0 kPa.

As illustrated in FIG. 8, it was confirmed that, even in a case where an entire length of the supply pipe 11' connecting the feeder 10' to the coaxial nozzle 7' was uniform, the outlet pressure of the connection pipe 11c' increased as the length of the connection pipe (end pipe) 11c' connected to the coaxial nozzle 7' increased. Further, in a case where a powder supply device having the same branch configuration in terms of the supply pipe 11' was used, it was confirmed that, even if an entire length of the supply pipe 11' connecting the feeder 10' to the coaxial nozzle 7' was changed, generally the same outlet pressure of the connection pipe 11c' was obtained provided that the length of the connection pipe 11c' connected to the coaxial nozzle 7' was the same.

That is, it was confirmed that the outlet pressure of the connection pipe 11c' largely depended on only the length of the connection pipe 11c' connected to the coaxial nozzle 7. In other words, it was confirmed that the length of the connection pipe 11c' connected to the coaxial nozzle 7' largely contributed to the outlet pressure of the connection pipe 11c'.

More specifically, in the example illustrated in FIGS. 7 and 8, it was confirmed that, when the length of the connection pipe 11c' was adjusted to around 0.5 m to 1.0 m, the outlet pressure of the connection pipe 11c' fell within the range of 1.0 kPa to 2.0 kPa, and the thickness of the clad layer formed in the machining part, that is, a machining allowance to finish the clad layer into a product shape could be secured.

From the experimental result, it was confirmed that, by adjusting the length of the connection pipe 11c' connected to the coaxial nozzle 7' so that the outlet pressure of the connection pipe 11c' fell within the range of 1.0 kPa to 2.0 kPa, the unevenness in the clad layer formed by the cladding could be restrained and the clad layer having a stable quality could be formed with a simple method. Further, it was confirmed that the powder supply device 4' that could form a clad layer having a desired quality (a thickness and a shape) could be easily designed and manufactured.

Thus, the embodiment of the present invention has been described with reference to the drawings, but concrete configurations of the present invention are not limited to the above embodiment. Even if there are changes of design or the like within a range that does not deviate from a gist of the present invention, they are included in the present invention.

What is claimed is:

1. A powder supply method in cladding to form a clad layer in a workpiece, in which powder is force-fed and supplied from a powder source to a powder cladding nozzle, and the powder cladding nozzle passes a laser beam through the powder cladding nozzle and discharges the powder toward the laser beam from a periphery of the laser beam, the powder supply method comprising:
   setting, within a predetermined range, an outlet pressure of a powder-cladding-nozzle side of a supply pipe connecting the powder source to the powder cladding nozzle; and
   supplying the powder from the powder source to the powder cladding nozzle.

2. The powder supply method according to claim 1, wherein:
   the supply pipe is configured such that a connection pipe in the supply pipe is connected to the powder source and the connection pipe is branched so that the supply pipe is connected to a plurality of supply passages provided in the powder cladding nozzle.

3. The powder supply method according to claim 2, wherein:
   respective pipe lengths from the powder source to the plurality of supply passages of the powder cladding nozzle are equal to each other.

4. The powder supply method according to claim 2, wherein:
   the supply pipe includes a first connection pipe connected to the powder source, a plurality of second connection pipes connected to the first connection pipe and configured to be branched from the first connection pipe into a plurality of directions, and a plurality of third connection pipes connected to the second connection pipes and configured to be branched from the plurality of second connection pipes into a plurality of directions; and
   end parts of the plurality of third connection pipes are connected to the plurality of supply passages provided in the powder cladding nozzle.

5. The powder supply method according to claim 4, wherein:
   the plurality of second connection pipes is set to have the same length; and
   the plurality of third connection pipes is set to have the same length.

6. The powder supply method according to claim 2, wherein:
   lengths of those connection pipes in the supply pipe which are connected to the supply passages of the powder cladding nozzle are adjusted so that the outlet pressure falls within the predetermined range.

7. The powder supply method according to claim 6, wherein:
   the lengths of the connection pipes connected to the supply passages of the powder cladding nozzle are 0.5 m to 1.0 m.

8. The powder supply method according to claim 1, wherein:
   the predetermined range is 1 kPa to 2 kPa.

9. The powder supply method according to claim 1, wherein:
   the predetermined range is set based on a setting lower limit of a cladding thickness.

* * * * *